US006078909A

United States Patent [19]
Knutson

[11] Patent Number: 6,078,909
[45] Date of Patent: Jun. 20, 2000

[54] METHOD AND APPARATUS FOR LICENSING COMPUTER PROGRAMS USING A DSA SIGNATURE

[75] Inventor: James Irwin Knutson, Austin, Tex.

[73] Assignee: International Business Machines Corporation, Armonk, N.Y.

[21] Appl. No.: 08/974,379

[22] Filed: Nov. 19, 1997

[51] Int. Cl.[7] .................................................. G06F 17/60
[52] U.S. Cl. ............................... 705/59; 380/21; 380/25; 380/23; 380/46; 380/4
[58] Field of Search .............................. 395/712; 380/21, 380/24, 23, 4; 705/1

[56] References Cited

U.S. PATENT DOCUMENTS

| | | | |
|---|---|---|---|
| 4,908,861 | 3/1990 | Brachtl et al. ............................ | 380/25 |
| 5,297,208 | 3/1994 | Schlafly et al. . | |
| 5,414,772 | 5/1995 | Naccache et al. . | |
| 5,438,508 | 8/1995 | Wyman .................................. | 364/401 |
| 5,542,086 | 7/1996 | Andrew et al. . | |
| 5,579,222 | 11/1996 | Bains et al. . | |
| 5,579,479 | 11/1996 | Plum . | |
| 5,625,695 | 4/1997 | M'Raihi et al. . | |
| 5,634,057 | 5/1997 | Dickinson . | |
| 5,812,664 | 9/1998 | Bernobich et al. ....................... | 380/21 |

OTHER PUBLICATIONS

Technical Disclosure Bulletin, vol. 36 No. 10 Oct. 1993, Asymmetric Authentication Protocol, pp. 413–415.

*Primary Examiner*—James P. Trammell
*Assistant Examiner*—Mussie Tesfamariam
*Attorney, Agent, or Firm*—David A. Mims, Jr.

[57] ABSTRACT

A method and apparatus for using a Digital Signature Algorithm (DSA) for providing licensing of software. Three steps are required to allow setting up a license, issuing a license and for customer update of the license. An initialization step generates a public and private key pair. A license generation step follows the initialization step and involves feeding the private key and data for the license terms through the DSA to create a digital signature. The digital signature hash value is distributed to the customer as a valid license. The customer performs license verification by running the signature, public key and data for the license through the DSA on the customer's machine.

15 Claims, 6 Drawing Sheets

☐ What does a digital signature look like?

```
-----BEGIN SIGNATURE-----
IQB1AwUBMVSiA5QYCuMfgNYjAQFAKgL/ZkBfbeNEsbthba4BlrcnjaqbcKgNv+a5kr4537y8
RCd+RHm75yYh5xxA1ojELwNhhb7cltrp2V7L1OnAelws4S87UX80cLBtBcN6AACfI1qymC2
h+Rb2j5SU+rmXWru+
=QFMx
-----END SIGNATURE-----
```

METHOD AND APPARATUS FOR LICENSING COMPUTER PROGRAMS USING A DSA SIGNATURE

FIELD OF THE INVENTION

The present invention relates to data processing systems, and more particularly, distributing and controlling their use on computers and computer networks of computer programs.

CROSS REFERENCE TO RELATED APPLICATIONS

This application is related in subject matter to the following application filed concurrently herewith and assigned to a common assignee:

Application Ser. No. 08/974,378 filed by Jim Knutson entitled, "Method and Apparatus For Creating Lightweight Licensing Component" (IBM Docket AT9-97-470).

The foregoing co-pending application is incorporated herein by reference.

BACKGROUND OF THE INVENTION

Software distribution is changing from the traditional method of packaging individual copies of the software with hard copy documentation to electronic distribution. The improvements in software distribution and licensing have helped to reduce cycle-time and cost, while at the same time allowing the user to copy and distribute the software at their will. The ease of distribution has also contributed to the problems of software piracy which has an adverse impact on the revenue stream of software developers/distributors.

One prior art solution provides a remote subscription service which allows users to subscribe to applications available on a server machine. An application list on a remote machine is updated when a connection is made to the appropriate application server machine. The application list is used by the remote user to subscribe to applications which allows the server machine to automatically update when a new version becomes available. The server machine contains the necessary structures and data to allow the client to realize what applications are currently available on the server and where the applications are physically located. The server machine compares the version numbers from the server file to the current applications installed on the users' computer. If the version numbers do not match, then the old version will be de-installed and the latest version will be installed. If the version numbers match, then the application is current and no further action is needed. More importantly, the ability to access the version numbers on the remote machine allows precise tracking of the licensed software on the remote machine when there is a licensing agreement with a software vendor. This solution suffers from the need to have a server and client machine running the appropriate software to allow accessing the version numbers on the client machine.

Another prior art solution discloses a protocol for software licensing where a prover is a license server and the verifier is an application program that wants to get permission to run. To obtain this, the application asks the license server if it may run and the server answers "yes" by proving that the license server possesses certain secret information embedded in the software license. The protocol does not require the software application maintains any secret information, and the server is required to perform the brunt of the computation. The server accomplishes authentication using ideas form the field of zero-knowledge protocols. The verifier knows "N" while the prover knows its factors, p and q. The verifier begins by choosing a random element x in the multiplicative group of integers modulo N. The verifier computes $x \sup hat2 \mod N$ and a hash of x under a cryptographic hash function h which is sent to the prover. The prover computes all four square roots of $x \sup hat2$. The prover applies h to each of them, to see which has a hash value which agrees with the hash value sent to him. This value, x', is returned to the verifier. If no value agrees, the request is treated as invalid. The verifier checks that the returned value x' is the same as x.

The introduction and acceptance of Java (™ of Sun Microsystems Inc.), an Internet protocol and platform independent product, further increases the likelihood of electronic distributions. Java represents an object-oriented language which satisfies the public's desire to animate and add dynamism to the static web pages of the Internet. Java permits writing to a virtual platform which is installed on most desktop web browsers. Java components can be GUI widgets, non-visual functions and services, applets and more full-scale applications. System managers have quickly recognized the advantage of a single master copy of programs that are stored in one place, ideal for easy update, that downloads to the client for the duration of the session, thus exploiting the users desktop processor in a client/server model but without the client side maintenance and version control costs. For details and background with respect to the Java System, reference may be made to a typical text, "Just Java", 2nd Edition, Peter van der Linden, Sun Microsystems, 1997.

A Java Development Kit (JDK) version 1.1 provides for the development of Java application programs. The JDK contains a Java Security API, built around the java.security package (and its subpackages). This API is designed to allow developers to incorporate both low-level and high-level security functionality into their Java applications. The JDK contains several cryptographic algorithms including a Digital Signature Algorithm (DSA) normally used to verify the authenticity of a signature and data associated with the data.

Consequently, it would be desirable to provide a method and apparatus utilizing the Digital Signature Algorithm for providing a low cost software licensing scheme.

SUMMARY OF THE INVENTION

This invention relates to a method and apparatus for using a Digital Signature Algorithm (DSA) for providing licensing of software. Three steps are required to allow setting up a license, issuing a license and for customer update of the license. An initialization step generates a public and private key pair. The public key is distributed with the software to be licensed while the private key is kept by the licensor and used to generate and issue the license. A license generation step follows the initialization step and involves feeding the private key and data for the license terms through the DSA. The license generation step results in the creation of a digital signature in the form of a hash value. The digital signature hash value is distributed to the customer as a valid license. Upon receiving the valid license, the customer performs license verification. This is accomplished by running the signature, public key and data for the license through the DSA on the customer's machine. An indication is generated which enables or restricts execution of the software on the customer's machine.

DETAILED DESCRIPTION OF THE EMBODIMENTS

This invention provides a method and apparatus for setting up and issuing software licenses for use in electronic distributions. Electronic distributions consist of information (e.g., documents, letters, graphic images, etc) that is generated or stored on a computer which is transmitted through a network or a similar medium to another computer. This invention is particularly applicable to the distribution of Java components which may be small applets or large scale applications. Software licensing is typically a complex problem requiring a large overhead and developer effort. This invention provides a simple low-cost software licensing solution by utilizing the well known Digital Signature Algorithm (DSA).

Figures 1, 2:
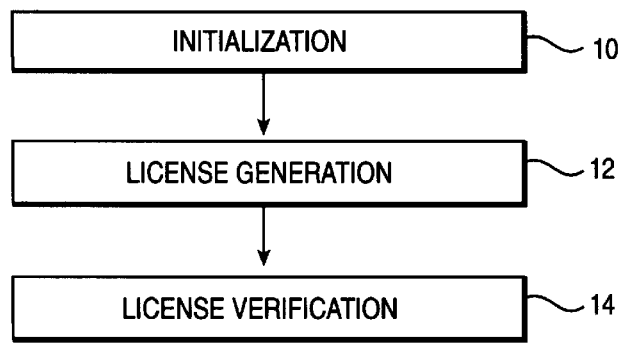
FIG. 1 illustrates a prior art digital signature produced by a Digital Signature Algorithm (DSA)
FIG. 2 is a block diagram of the steps required to provide licensing for software using DSA.

Referring now to FIG. 1, there is shown an example of a digital signature used for signing electronic documents using DSA. There is no relationship to the signer's handwritten signature. The visible portion of the digital signature may consist of the signer's name, title and firm name, along with a certificate serial number. A digital signature is more of a process than just affixing a signature. For example, when a document is "digitally signed," the digital software scans the document and creates a calculation which represents the document. This calculation becomes part of the "digital signature". When the recipient authenticates the signature, a similar process is carried out in a manner well known in the art. The sender's and the receiver's calculation are then compared. If the results are the same, the signature is valid; if they are different, the signature is not valid. DSA is frequently provided as a utility or in Java development kits, such as the Java Development Kit 1.1 (JDK), for verifying the authenticity of a signature and the data associated with it.

Figure 3:
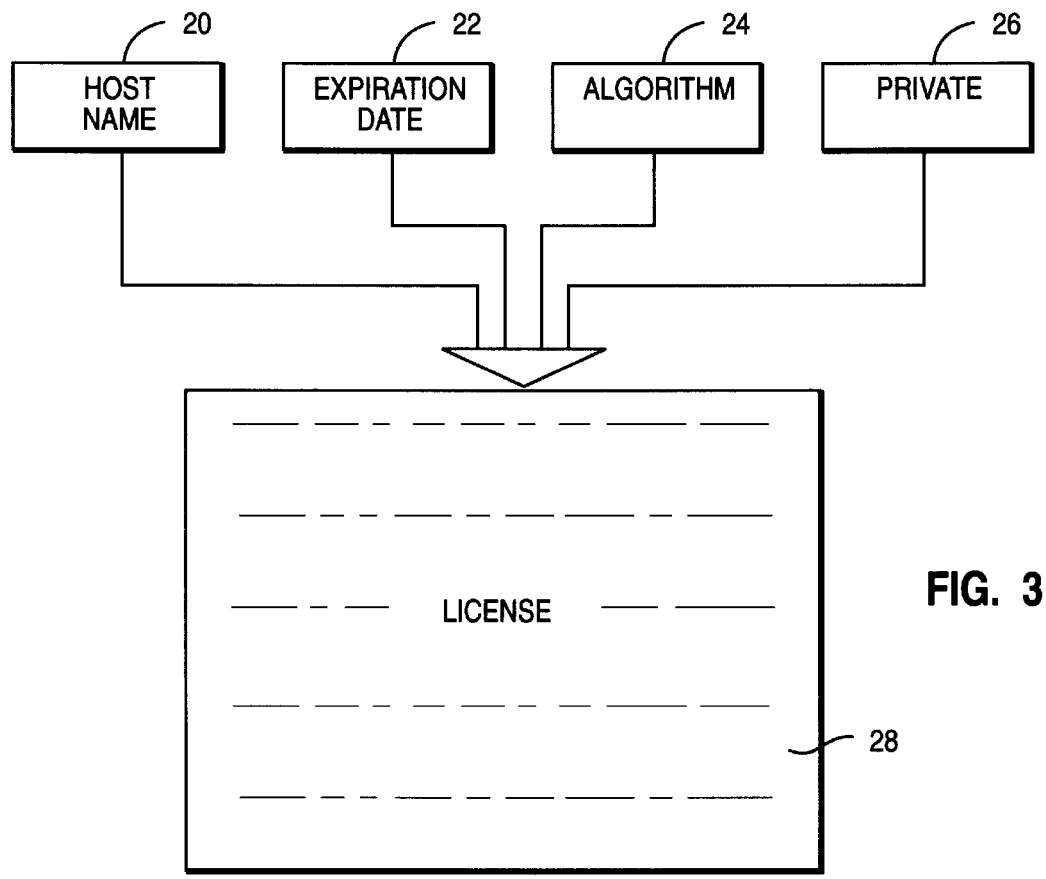
FIG. 3 illustrates the items used to produce a software license using this invention.

Referring now to FIG. 2, there is shown the three steps required to provide licensing for software using DSA. The initialization step 10 involves generating a public and private key pair compatible for use by DSA. The public key is distributed with the licensed software. The private key is kept by the licensor to be used for generating and issuing the license. The initialization step 10 is followed by a license generation step 12. The license is generated and issued by the licensor using DSA and the private key. Turning to FIG. 3, there is shown additional details for generating the software license. The license 28 consists of a host name 20 which identifies the name of the host machine where the license will be executed. An expiration_date 22 is also provided defining the term for the licensed software. A private key 26 generated during the initialization step is utilized to uniquely identify the licensed software. Finally, the DSA 24 utility for generating the digital signature for the license 28 is specified. One skilled in the art will appreciate that additional information may be included in the license generation step. For example, the licensor's name, User Identification Number (Userid), beginning date of license, serial number, etc may all be included during the generation of the license. The license generation step 12 results in the generation of a license hash code or digital signature which is transmitted to the licensee.

Referring again to FIG. 2, the final step of the procedure consists of license verification 14. This step is performed by the licensee's computer. Verification 14 consists of inputting the digital signature, public key, and license data through the DSA to produce a true or false indication at the licensee computer.

Figure 4:
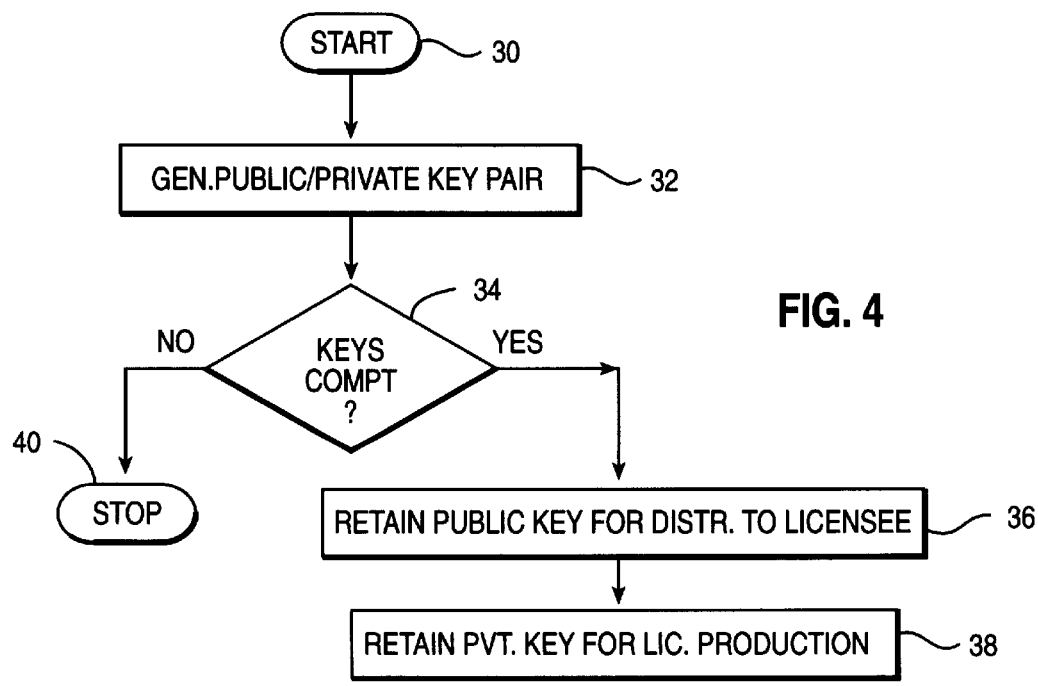
FIG. 4 is a flow diagram of the initialization step for producing and issuing a software license.

Referring to FIG. 4, there is shown a flow diagram for the initialization step 10 of FIG. 2. The procedure starts at block 30 and moves immediately to block 32 where a public and private key is generated using DSA compatible key generation techniques, by methods well known in the art. At block 34 a check is carried out to determine if key generation is completed. If NO, the procedure stops at block 40. Else, processing continues at block 36 where the public key is retained for distribution to the licensee. At block 38, the private key is retained for the license generation step 12 of FIG. 2.

Figure 5:
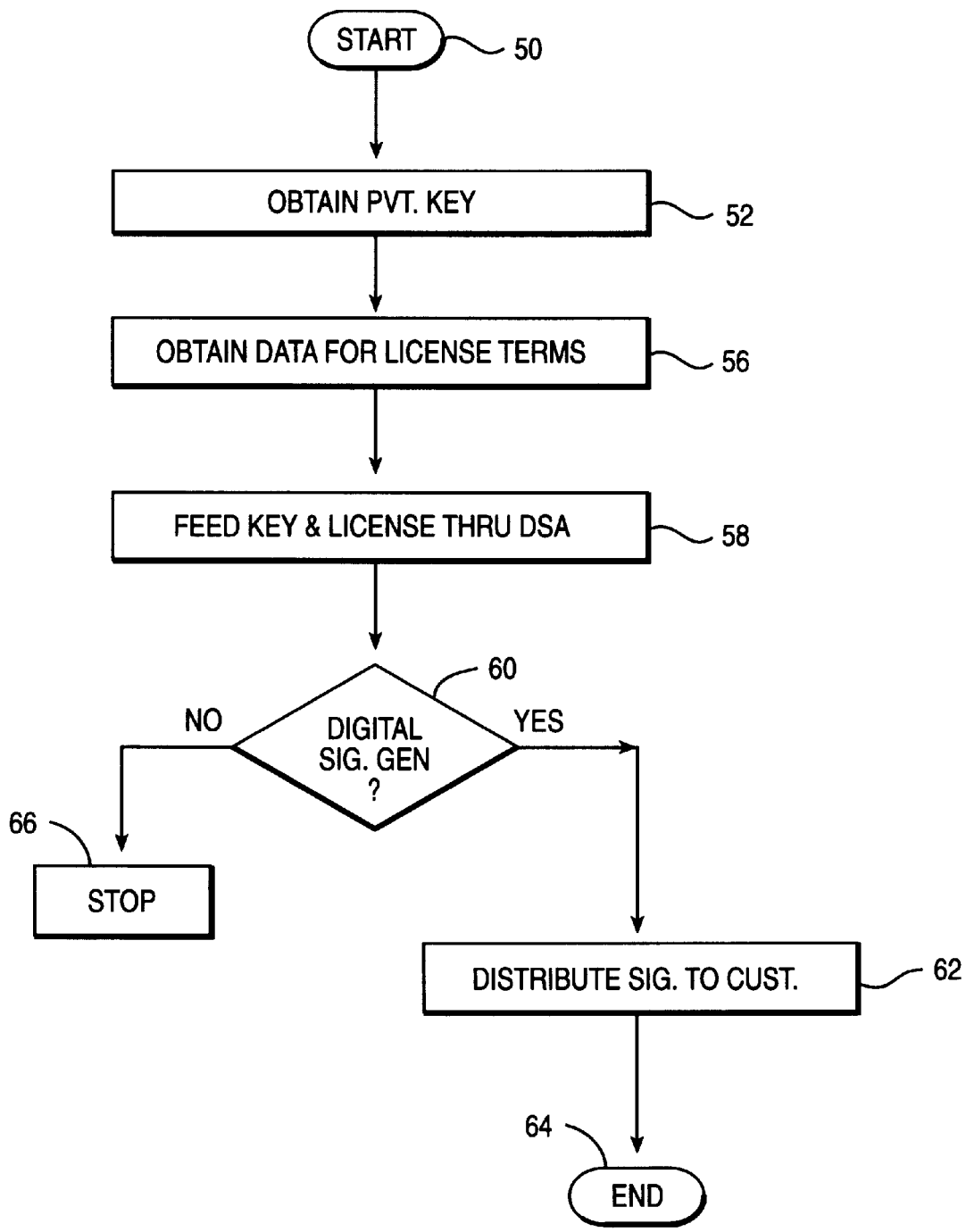
FIG. 5 is a flow diagram for the license generation step of the present invention.

Referring now to FIG. 5, there is shown a flow diagram of the license generation step 12 shown in FIG. 2. The procedure starts at block 50 and proceeds immediately to block 52 where the private key is obtained that was generated during the Initialization step 10. At block 56, the procedure obtains the data for the license terms. The private key and data for the license terms are fed through the DSA as shown in block 58 to produce a license hash code/ signature. At block 60 the procedure checks to see if a digital signature is generated successfully. If NO, processing stops at block 66. Else, processing continues at block 62 where the digital signature is distributed to the customer/licensee and the procedure ends at block 64.

Figure 6:
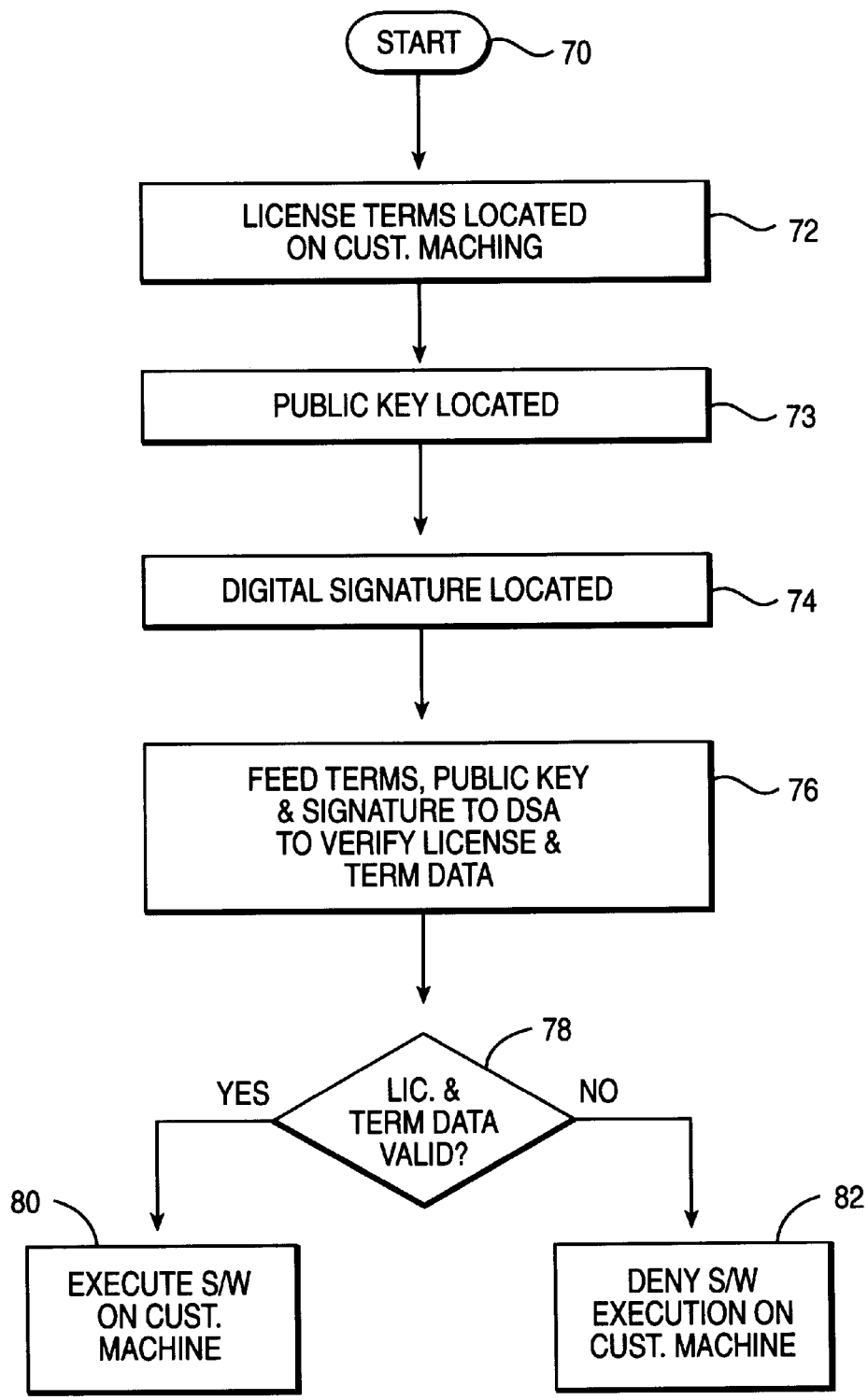
FIG. 6 is a flow diagram for the license verification step of the present invention.

Referring now to FIG. 6, there is shown a flow diagram of the license verification step 16 shown in FIG. 2. Processing starts at block 70 and proceeds to block 72 where the data for the license terms is located on the customer's or licensee's machine. At block 73, the public key is located along with the digital signature as shown at block 74. The digital signature, public key and data for the license terms are run through the DSA to verify the license as shown at block 76. At block 78, the procedure checks to see if the true/false indication generated by the DSA is valid. If NO, the procedure inhibits software execution on the licensee/ customer's machine as shown in block 82. If the indications is true, execution of the software on the Customer's machine is permitted as shown in block 80.

Figure 7:
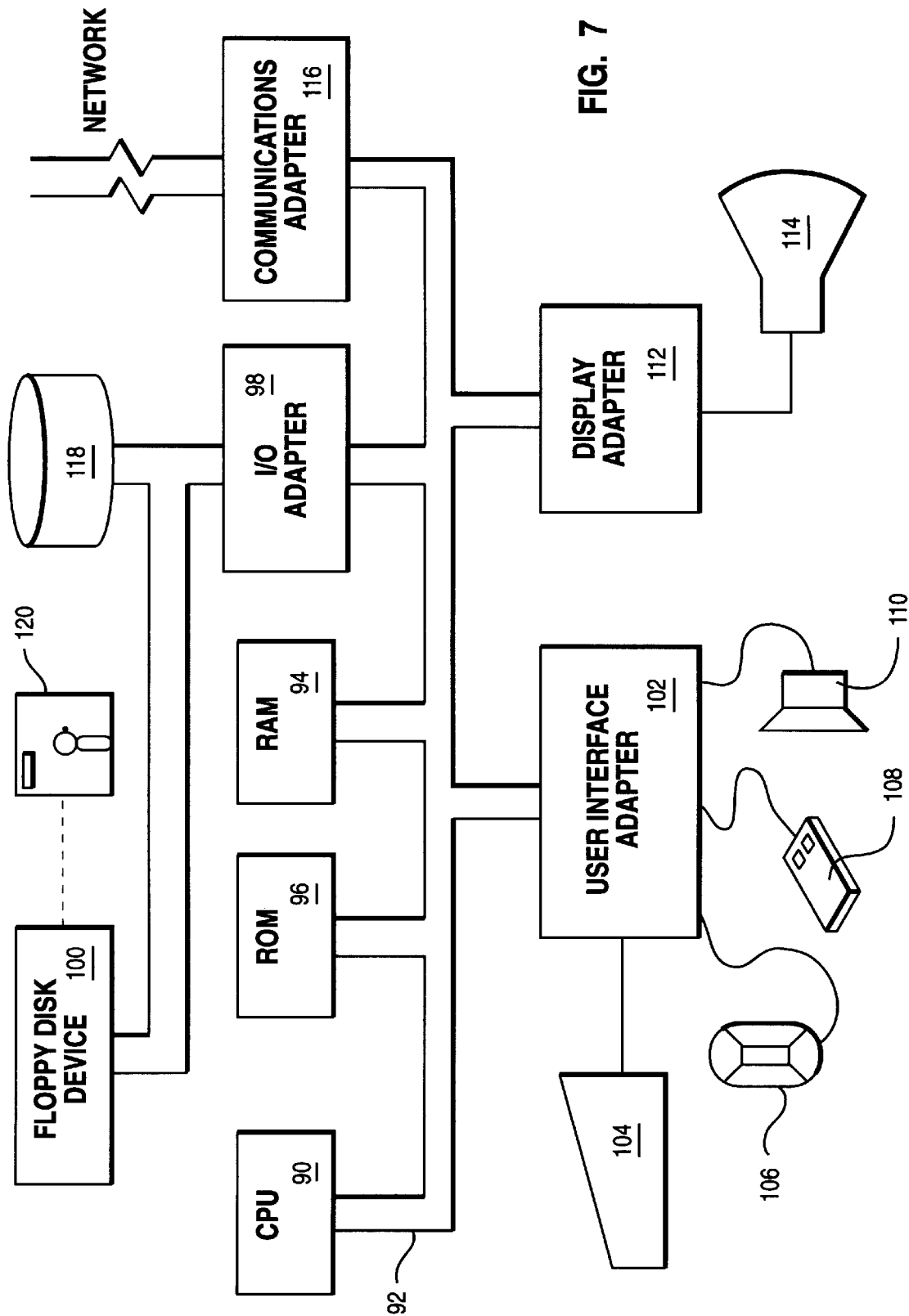
FIG. 7 illustrates a computer/workstation where this invention may be practiced.

Referring now to FIG. 7, there is shown a pictorial representation of a workstation, having a central processing unit 50, such as a conventional microprocessor, and a number of other units interconnected via a system bus 60. The workstation shown in FIG. 4, includes a Random Access Memory (RAM) 54, Read Only Memory (ROM) 52, an I/O adapter 56 for connecting peripheral devices such as floppy disk unit 76 to the bus, a user interface adapter 64 for connecting a keyboard 62, a mouse 72, a speaker 70, a microphone 74, and/or other user interface devices such as a touch screen device (not shown) to the bus, a communication adapter 58, for connecting the workstation to a data processing network and a display adapter 68, for connecting the bus to a display device 66. The workstation, in the preferred embodiment, has resident thereon the computer software making up this invention, which may be loaded from diskette 78.

Figure 8:
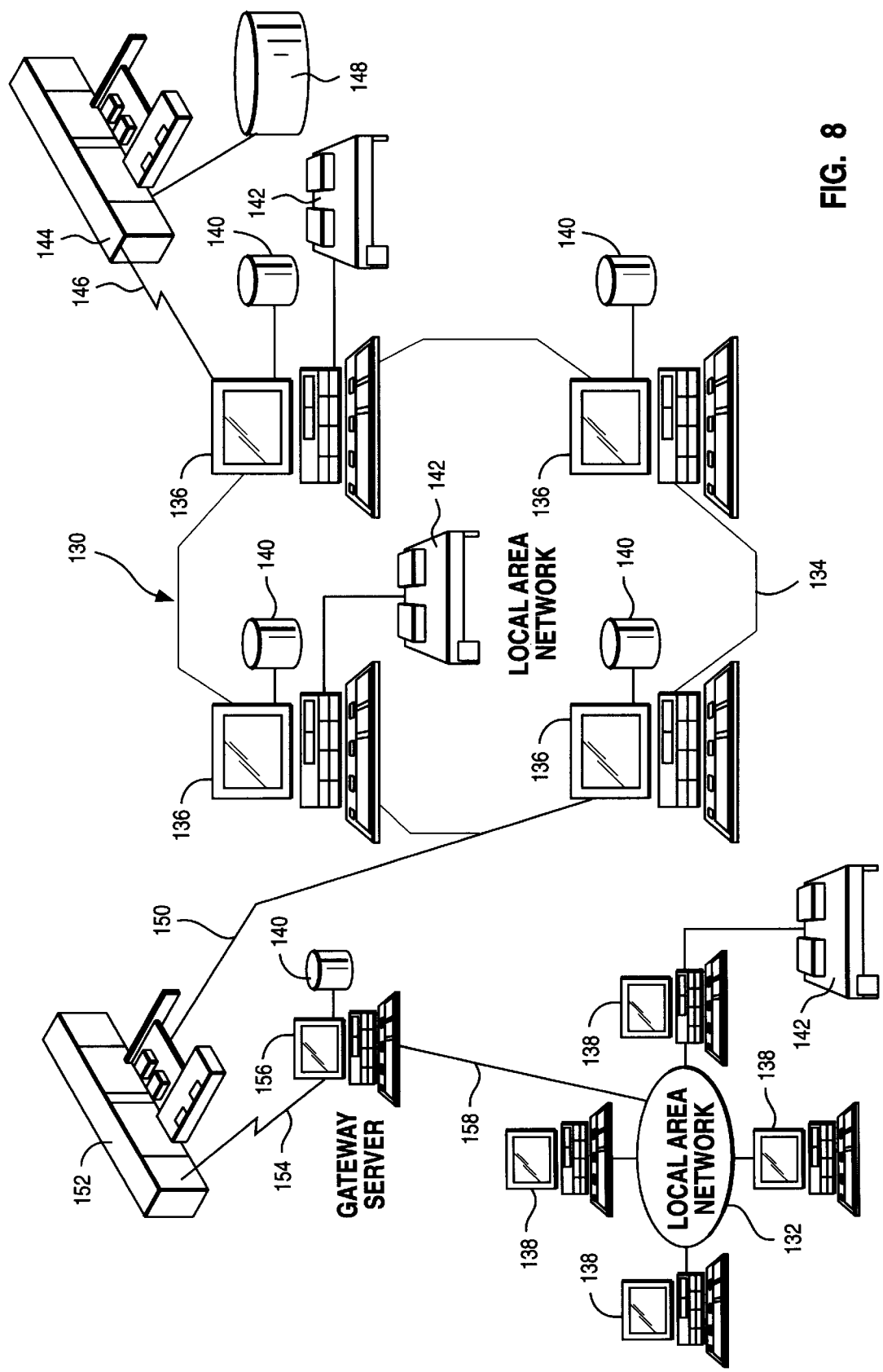
FIG. 8 is an illustrative embodiment of a computer network where the present invention may be practiced.

A representative network environment where this invention may be practiced is depicted in FIG. 8, which illustrates a pictorial representation of a distributed data processing system 90. As illustrated, data processing system 90 contains a plurality of networks, including local area networks (LAN) 92 and 94, each of which preferably includes a plurality of individual computers 96 and 98, respectively as shown in FIG. 4. One skilled in the art will appreciate that a plurality of workstations coupled to a host processor may be utilized for each such network. As is common in such data processing systems, each computer 96 and 98, may be coupled to a storage device 100, and a printer 102.

Data processing system 90 further includes one or more mainframe computers, such as mainframe computer 104, which may be preferably coupled to LAN 92 by means of a communication link 106. Mainframe computer 104 is preferably coupled to a storage device 108, which serves as remote storage for LAN 92. LAN 92 is also coupled via communications link 110 through communications controller 112 and communications link 114 to gateway server 116. Gateway server 116 is preferably a workstation which serves to link LAN 94 to LAN 92 via communications link 118. As understood by one skilled in the art, data processing system 90 additionally includes unillustrated gateways, routers, bridges, and various other network hardware utilized to interconnect the segments of data processing system 90.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for licensing software for electronic distributions in said computer system, comprising the steps of:

generating a pair of keys compatible for use with a digital signature algorithm for a license for a selected electronic distribution in said computer system at a licensor machine;

generating a digital signature for said license using one of said pair of keys for data and all information related to said license using said digital signature algorithm at said licensor machine;

transmitting said digital signature directly from said licensor machine to a user for said selected electronic distribution; and verifying said license by said user using said digital signature algorithm on said digital signature, data for said license and a different one of said pair of keys without any further transmissions with said licensor machine.

2. The method of claim 1 wherein said step of generating a pair of keys further comprises:

distributing said public key to said user in said electronic distribution; and retaining said private key for generation of said digital signature for said license.

3. The method of claim 1 wherein said step of generating a digital signature further comprises:

providing information to said digital signature algorithm.

4. The method of claim 1 wherein said step of generating a digital signature further comprises:

providing information to said digital signature algorithm including data for license terms for said license.

5. The method of claim 1 wherein said step of verifying said license further comprises:

generating a true/false indication by said DSA for said license using said public key.

6. An apparatus for licensing software for electronic distributions in a computer system, comprising:

means for generating a pair of keys compatible for use with a digital signature algorithm for a license for a selected electronic distribution in said computer system;

means for generating a digital signature for said license using one of said pair of keys for data and all information related to said license using said digital signature algorithm at a licensor machine;

means for transmitting said digital signature directly from said licensor machine to a user for said selected electronic distribution; and means for verifying said license by said user using said digital signature algorithm on said digital signature, data for said license and a different one of said pair of keys without further transmissions to said licensor machine.

7. The apparatus of claim 6 wherein said means for generating a pair of keys further comprises:

means for distributing said public key to said user in said electronic distribution; and means for retaining said private key for generation of said digital signature for said license.

8. The apparatus of claim 6 wherein said means for generating a digital signature further comprises:

means for providing information to said digital signature algorithm.

9. The apparatus of claim 6 wherein said means for generating a digital signature further comprises:

means for providing information to said digital signature algorithm including data for license terms for said license.

10. The apparatus of claim 6 wherein said means for verifying said license further comprises:

means for generating a true/false indication by said DSA for said license using said public key.

11. A computer program product having a computer readable medium having computer program logic recorded thereon for licensing software for electronic distributions in a computer system, comprising:

computer readable means for generating a pair of keys compatible for use with a digital signature algorithm for a license for a selected electronic distribution in said computer system at a licensor machine;

computer readable means for generating a digital signature for said license using one of said pair of keys for data and all information related to said license using said digital signature algorithm at said licensor machine;

computer readable means for transmitting said digital signature directly from said licensor machine to a user for said selected electronic distribution; and computer readable means for verifying said license by said user using said digital signature algorithm on said digital signature, data for said license and a different one of said pair of keys without further transmissions to said licensor machine.

12. A computer program product of claim 11 wherein said computer readable means for generating a pair of keys further comprises:

computer readable means for distributing said public key to said user in said electronic distribution; and computer readable means for retaining said private key for generation of said digital signature for said license.

13. A computer program product of claim 11 wherein said computer readable means for generating a digital signature further comprises:

computer readable means for providing information to said digital signature algorithm.

14. A computer program product of claim 11 wherein said computer readable means for generating a digital signature further comprises:

computer readable means for providing information to said digital signature algorithm including data for license terms for said license.

15. A computer program product of claim 11 wherein said computer readable means for verifying said license further comprises:

computer readable means for generating a true/false indication by said DSA for said license using said public key.

\* \* \* \* \*